US008094256B2

(12) United States Patent
Okamoto et al.

(10) Patent No.: US 8,094,256 B2
(45) Date of Patent: Jan. 10, 2012

(54) ACTIVE MATRIX SUBSTRATE, A LIQUID CRYSTAL PANEL, A DISPLAY DEVICE, A TELEVISION RECEIVER, AND METHODS OF CORRECTING AND PRODUCING THE SUBSTRATE AND PANEL

(75) Inventors: Masaomi Okamoto, Kameyama (JP); Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 541 days.

(21) Appl. No.: 12/094,863

(22) PCT Filed: Oct. 16, 2006

(86) PCT No.: PCT/JP2006/320559
§ 371 (c)(1),
(2), (4) Date: Mar. 20, 2009

(87) PCT Pub. No.: WO2007/063649
PCT Pub. Date: Jun. 7, 2007

(65) Prior Publication Data
US 2009/0279014 A1 Nov. 12, 2009

(30) Foreign Application Priority Data

Nov. 24, 2005 (JP) .................................. 2005-338067

(51) Int. Cl.
*G02F 1/1343* (2006.01)
(52) U.S. Cl. .......................................... 349/54; 349/144
(58) Field of Classification Search ........................ None
See application file for complete search history.

(56) References Cited

U.S. PATENT DOCUMENTS

| 5,164,851 | A * | 11/1992 | Kanemori et al. | 349/55 |
| 6,710,825 | B2 * | 3/2004 | Kubo et al. | 349/48 |
| 2004/0100434 | A1 * | 5/2004 | Ahn et al. | 345/93 |
| 2006/0146215 | A1 * | 7/2006 | Huang et al. | 349/43 |
| 2008/0192165 | A1 * | 8/2008 | Nakagawa et al. | 349/55 |
| 2011/0205460 | A1 * | 8/2011 | Chang et al. | 349/19 |

FOREIGN PATENT DOCUMENTS

| JP | 01-291215 | 11/1989 |
| JP | 01-291215 A | 11/1989 |

(Continued)

OTHER PUBLICATIONS

International Search Report for PCT/JP2006/320559 dated Nov. 28, 2006.

(Continued)

*Primary Examiner* — Mike Stahl
(74) *Attorney, Agent, or Firm* — Nixon & Vanderhye P.C.

(57) ABSTRACT

An active matrix substrate in which wherever a short between adjacent pixel electrodes of a liquid crystal panel is located in peripheral portions of the pixel electrodes, the short can be efficiently corrected without forming both short-circuited pixels into black dots, and a liquid crystal panel having the active matrix substrate, as well as methods of correcting the AM substrate and the liquid crystal panel. Each of pixel electrodes arranged in a matrix in an active matrix substrate is divided into a plurality of minute regions, and the minute regions are integrally connected by electrically connecting portions. A plurality of lines arranged to transmit signals to each of the pixel electrodes are placed so as not to coincide with the electrically connecting portions of each of the pixel electrodes.

10 Claims, 8 Drawing Sheets

FOREIGN PATENT DOCUMENTS

| | | | |
|---|---|---|---|
| JP | 08-234236 | | 9/1996 |
| JP | 08-234236 A | | 9/1996 |
| JP | 10-123565 A | | 5/1998 |
| JP | 11-7046 A | * | 1/1999 |
| JP | 2001-305575 A | * | 10/2001 |
| JP | 2002-122886 A | | 4/2002 |
| JP | 2003-156855 | | 5/2003 |
| JP | 2003-156855 A | | 5/2003 |
| JP | 2004-258139 | | 9/2004 |
| JP | 2004-258139 A | | 9/2004 |
| JP | 2006-171762 | | 6/2006 |
| JP | 2006-171762 A | | 6/2006 |

OTHER PUBLICATIONS

Office Action and translation dated Apr. 5, 2011 from corresponding Japanese patent application.

* cited by examiner

US 8,094,256 B2

ACTIVE MATRIX SUBSTRATE, A LIQUID CRYSTAL PANEL, A DISPLAY DEVICE, A TELEVISION RECEIVER, AND METHODS OF CORRECTING AND PRODUCING THE SUBSTRATE AND PANEL

This application is the U.S. national phase of International Application No. PCT/JP2006/320559 filed 16 Oct. 2006 which designated the U.S. and claims priority to Japanese Application No. 2005-338067 filed 24 Nov. 2005, the entire contents of each of which are hereby incorporated by reference.

BACKGROUND OF THE INVENTION

1. Field of the Invention

The present invention relates to an active matrix substrate and a display device having the substrate, a liquid crystal panel and a display device having the panel and a television receiver as well as methods of correcting the substrate and the panel and methods of producing the substrate and the panel. The present invention specifically relates to an active matrix substrate in which a display defect resulting from a short between pixel electrodes can be effectively corrected and a display device having the substrate, a liquid crystal panel and a display device having the panel and a television receiver as well as methods of correcting the substrate and the panel and methods of producing the substrate and the panel.

2. Description of the Related Art

In recent years, a liquid crystal display device is widely used as a display unit of an electronic product such as a computer and a television. In the liquid crystal display device, a liquid crystal panel is used, and the liquid crystal panel is made by opposing and putting together a pair of transparent substrates, bonding them by a sealing material, and sealing in a liquid crystal between the transparent substrates sealed by the sealing material. In the liquid crystal panel, pixel electrodes are provided on one of the transparent substrates, and common electrodes are provided on the other transparent substrate so as to be opposed to the pixel electrodes. Alignment of liquid crystal molecules is varied by an electric field generated between the pixel electrodes and the common electrodes, and transmittance of light entering from the transparent substrate on which the pixel electrodes are provided is varied, so that display conditions are controlled. In the following descriptions, the side of the liquid crystal panel on which an image is displayed and the common electrodes are provided is referred to as a front side, and the side of the liquid crystal panel on which the pixel electrodes are provided is referred to as a back side.

Widely used as such a liquid crystal panel is an active matrix type liquid crystal panel which is made by bonding an active matrix substrate (hereinafter, referred to as AM substrate) and a color filter substrate (hereinafter, referred to as CF substrate) by a sealing material, and sealing in a liquid crystal between the substrates sealed by the sealing material. In the AM substrate, pixel electrodes are arranged in a matrix on a transparent substrate, switching elements are provided to the pixel electrodes, and a plurality of source lines arranged to supply display signals to the switching elements and a plurality of gate lines arranged to supply scanning signals to the switching elements are provided so as to intersect to each other. In the CF substrate, color filters are provided in regions divided by a black matrix (hereinafter, referred to as BM), common electrodes are provided so as to be opposed to the pixel electrodes, and alignment control projections having the shape of a linear projection are formed on the common electrodes.

In recent years, improvement in display quality is required for such a liquid crystal panel. However, as the density of pixels of the liquid crystal panel increases, it becomes more difficult to produce such a liquid crystal panel without causing defects in lines or electrodes such as a short between the electrodes. In addition, if the liquid crystal panel is increased in the size while the number of pixel electrodes in the whole display screen is maintained as conventional, an area per pixel is increased, and a defect becomes visually perceived with ease. Accordingly, it is inevitable to correct produced display defects in order to achieve high quality display.

Generally, in a case where a display defect resulting from a short between adjacent pixel electrodes is detected in such a liquid crystal panel, if the short between the adjacent pixel electrodes is located at such a position that making laser irradiation to the short from the back side of the liquid crystal panel is allowed, laser irradiation is made to the short between the adjacent pixel electrodes from the front side or the back side of the liquid crystal panel so as to make a disconnection at the short. However, if the pixel electrode partially coincides with the lines and the BM and the short between the adjacent pixel electrodes is located over the lines such as source lines and gate lines that are light shields or other electrodes, making laser irradiation to the short between the adjacent pixel electrodes is not allowed.

Conventionally, when the short between the adjacent pixel electrodes is located over the light shield such as the lines and the BM, defect correction is performed by forming both the pixels into black dots (or bright dots) while leaving the pixel electrodes short-circuited. However, the black dots (or the bright dots) made up of two or more adjacent pixels are visually perceived with ease, so that effective defect correction cannot be always performed. Therefore, there are proposed a liquid crystal panel and a method of correcting a defect of the display panel to be described below.

For example, Japanese Patent Application Unexamined Publication No. Hei 10-123565 discloses a liquid crystal panel in which a short between adjacent pixel electrodes can be corrected and a method of correcting the short. In this liquid crystal panel, a BM which is generally provided on a CF substrate is omitted in order that laser irradiation is made to the short between the adjacent pixel electrodes from a front side (CF filter side) of the liquid crystal panel so as to make a disconnection at the short. By doing this, the short between the adjacent pixel electrodes can be corrected even though the short is located at such a position that making laser irradiation to the short from the back side of the liquid crystal panel is not allowed because, for example, the short is located over the source lines or the gate lines. However, because the BM has the function of preventing a light leak between adjacent pixels or mixture of colors at the time of forming color filters, there is a problem that the omission of the BM makes it difficult to display a well colored image with high definition.

In addition, Japanese Patent Application Unexamined Publication No. 2002-122886 discloses a liquid crystal panel in which a defect resulting from a short between a pixel electrode and a common electrode can be corrected and a method of correcting the defect. In this liquid crystal panel, the pixel electrode is prepared by coupling a plurality of sub-pixel electrodes via connecting portions so that the pixel electrode can be divided, and only a pixel in which the defect occurs is disconnected and formed into a black dot. By doing this, an area in which the black dot is formed can be reduced, and the black dot is difficult to visually perceive after the defect correction.

However, the liquid crystal panel disclosed by Japanese Patent Application Unexamined Publication No. 2002-122886 is produced without consideration of the defect resulting from the short between the adjacent pixel electrodes, and without specifying a relative location of lines such as gate lines, source lines, auxiliary capacitance lines and drain lines to the connecting portions that connect the sub-pixel electrodes. Accordingly, in spite of the fact that the sub-pixel electrodes are provided, there are problems that some of the sub-pixel electrodes cannot be individually disconnected, and the position of a contact hole that connects a switching element and the pixel electrode is limited if the defect resulting from the short between the pixel electrodes is to be corrected, and dedicated lines for the sub-pixel electrodes need to be provided, which results in reduction of an aperture ratio of the liquid crystal panel. For example, if the sub-pixel electrode having the contact hole is short-circuited from the adjacent pixel electrode, the defect correction cannot be performed.

SUMMARY OF THE INVENTION

An object of the invention is to overcome the problems described above and to provide an AM substrate in which pixel electrodes are arranged in a matrix, and wherever a short between adjacent pixel electrodes of the liquid crystal panel is located in peripheral portions of the pixel electrodes, the short can be efficiently corrected without forming both short-circuited pixels into black dots, and a liquid crystal panel, and a method of correcting the AM substrate and the liquid crystal panel, and additionally provide a liquid crystal display device and a television receiver having the liquid crystal panel.

In order to overcome the problems described above, preferred embodiments of the present invention provide an active matrix substrate (AM substrate) having a transparent substrate, pixel electrodes, each of which is divided into a plurality of minute regions, the minute regions being integrally connected by electrically connecting portions arranged to electrically connect the minute regions of each of the pixel electrodes, and a plurality of lines arranged to transmit signals to each of the pixel electrodes, the pixel electrodes and the lines being arranged in layers, wherein the lines are placed so as not to coincide with the electrically connecting portions.

In the active matrix substrate, it is preferable if at least one of the minute regions of each of the pixel electrodes has a contact portion arranged to transmit the signals to each of the pixel electrodes, and the lines are placed so as not to coincide with a space between the minute regions having the contact portions of the adjacent pixel electrodes.

In addition, it is more preferable if the lines have an opening portion, and the opening portion is placed so as to coincide with the space between the minute regions having the contact portions of the adjacent pixel electrodes.

Preferred embodiments of the present invention also provide a liquid crystal panel having a pair of transparent substrates interposing a liquid crystal therebetween, one of the transparent substrates having pixel electrodes provided thereon, each of which is divided into a plurality of minute regions, the minute regions being integrally connected by electrically connecting portions arranged to electrically connect the minute regions of each of the pixel electrodes, and a plurality of lines arranged to transmit signals to each of the pixel electrodes, the pixel electrodes and the lines being arranged in layers, and the other transparent substrates having common electrodes opposed to the pixel electrodes, wherein the lines are placed so as not to coincide with the electrically connecting portions.

In the liquid crystal panel, it is preferable if at least one of the minute regions of each of the pixel electrodes has a contact portion arranged to transmit the signals to each of the pixel electrodes, and the lines are placed so as not to coincide with a space between the minute regions having the contact portions of the adjacent pixel electrodes.

In addition, it is more preferable if the lines have an opening portion, and the opening portion is placed so as to coincide with the space between the minute regions having the contact portions of the adjacent pixel electrodes.

In addition, it is more preferable if the transparent substrate having the common electrodes has a light shielding region so as to cover peripheral portions of the pixel electrodes provided to the transparent substrate having the pixel electrodes, and the opening portion provided to the lines of the transparent substrate having the pixel electrodes is placed so as to coincide with the light shielding region of the transparent substrate having the common electrodes.

The liquid crystal panel preferably has such a configuration that liquid crystal capacitances are provided between the pixel electrodes and the common electrodes opposed to the pixel electrodes interposing the liquid crystal, auxiliary capacitances are provided to the liquid crystal capacitances, and a plurality of adjacent pixels are assumed to form one pixel group, wherein signals of the same amplitude are supplied through the shared lines to the liquid crystal capacitances of each of the pixel groups and different auxiliary capacitance voltages are supplied to the auxiliary capacitances of each of the pixel groups in order to have different effective values of voltages in the liquid crystal capacitances of each of the pixel groups.

The liquid crystal panel may have such a configuration as the MVA (Multi-domain Vertical Alignment) mode described in Japanese Patent Application Unexamined Publication No. Hei 11-242225 in which each of the pixel electrodes has a plurality of slits arranged to divide the minute regions which are integrally connected by the electrically connecting portions and be inclined in different directions with respect to the edges of each of the pixel electrodes so as to make liquid crystal molecules to be aligned between the pixel electrodes and the common electrodes have different alignment directions according to the inclination directions of the slits.

The AM substrate is suitably used as a display mechanism of a display device.

The liquid crystal panel mentioned above is suitably used as a display mechanism of a liquid crystal display device, or a display mechanism of a television receiver.

In the AM substrate or the liquid crystal panel mentioned above, a short between adjacent pixel electrodes is corrected in the following manner. First, if the short between the adjacent pixel electrodes is located over the light shield such as the lines, the correction is performed such that laser irradiation is made to the electrically connecting portion that connects the minute region having the short and the minute region of one pixel electrode so as to make a disconnection at the electrically connecting portion and electrically separate the minute region having the short from the other minute regions.

In addition, if the short between the adjacent pixel electrodes is located over the space between the minute regions having the contact portions of the adjacent pixel electrodes, the correction is performed by making laser irradiation to the short, in a portion where the lines are not placed, so as to make a disconnection at the short.

Preferred embodiments of the present invention provide a production method of a liquid crystal panel having the steps of producing the AM substrate, when producing the liquid crystal panel having a pair of transparent substrates interposing a liquid crystal therebetween, by providing pixel electrodes and a plurality of lines arranged to transmit signals to each of the pixel electrodes on one of the transparent substrates, inspecting the pixel electrodes and/or the lines provided on the AM substrate in order to detect a defect, correcting the defect detected in the AM substrate inspecting step by the correction method mentioned above, producing the liquid crystal panel by opposing and putting together the AM substrate and the other transparent substrate at a given space and sealing in a liquid crystal between the transparent substrates, inspecting the pixel electrodes and/or the lines of the liquid crystal panel in order to detect a defect, and correcting the defect detected in the liquid crystal panel inspecting step by the correction method mentioned above.

According to the AM substrate or the liquid crystal panel described above, the pixel electrodes arranged in a matrix on the transparent substrate are divided into the minute regions, the minute regions are integrally connected by the electrically connecting portions, and the electrically connecting portions are placed so as not to coincide with the light shield such as the lines. Therefore, even if the short between the adjacent pixel electrodes is located over the lines, a disconnection can be made by making irradiation to the electrically connection portion so as to separate the minute region having the short from the other minute regions.

Additionally, the space between the minute regions having the contact portions of the adjacent pixel electrodes is placed so as not to coincide with the lines. Therefore, even if the short between the adjacent pixel electrodes is located over the space, making laser irradiation to the short so as to make a disconnection at the short is allowed. Accordingly, wherever the short between the adjacent pixel electrodes is located in the peripheral portions of the pixel electrode, the display defect can be corrected without making both pixels into black dots.

In addition, by supplying the display signals of the same amplitude to the adjacent pixel electrodes and supplying the different auxiliary capacitance voltages to the auxiliary capacitances of the pixel electrodes assuming that the adjacent pixels form one pixel group, the pixels in said pixel group can have different gradations, so that display with a favorable wide viewing angle can be achieved.

As mentioned above, wherever the short between the adjacent pixel electrodes is located in the pixel electrodes, more advantageous correction than conventional correction of forming the two pixels having the short into black dots can be performed. As a result, reduction in display quality of the liquid crystal panel can be suppressed, the occurrence of defected products can be reduced, and a contribution is made to improvement in yields in the production process.

Other features, elements, characteristics and advantages of the present invention will become more apparent from the following detailed description of preferred embodiments with reference to the attached drawings.

DETAILED DESCRIPTION OF PREFERRED EMBODIMENTS

A detailed description of preferred embodiments of the present invention will now be provided with reference to FIGS. 1 to 7.

Figure 1:
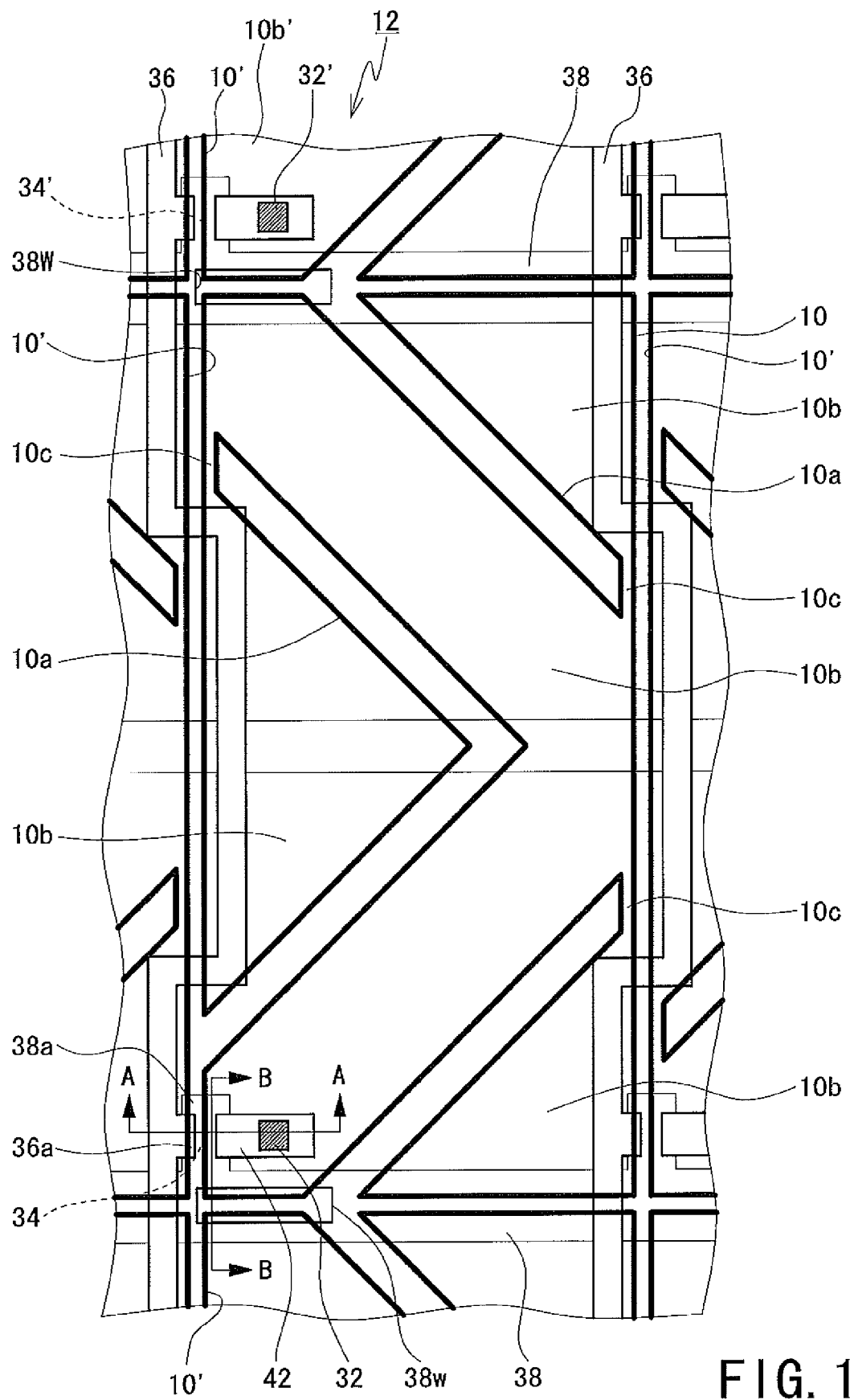
FIG. 1 is a magnified plan view of one of pixel electrodes arranged in an active matrix substrate according to a first preferred embodiment of the present invention.
Figure 2:
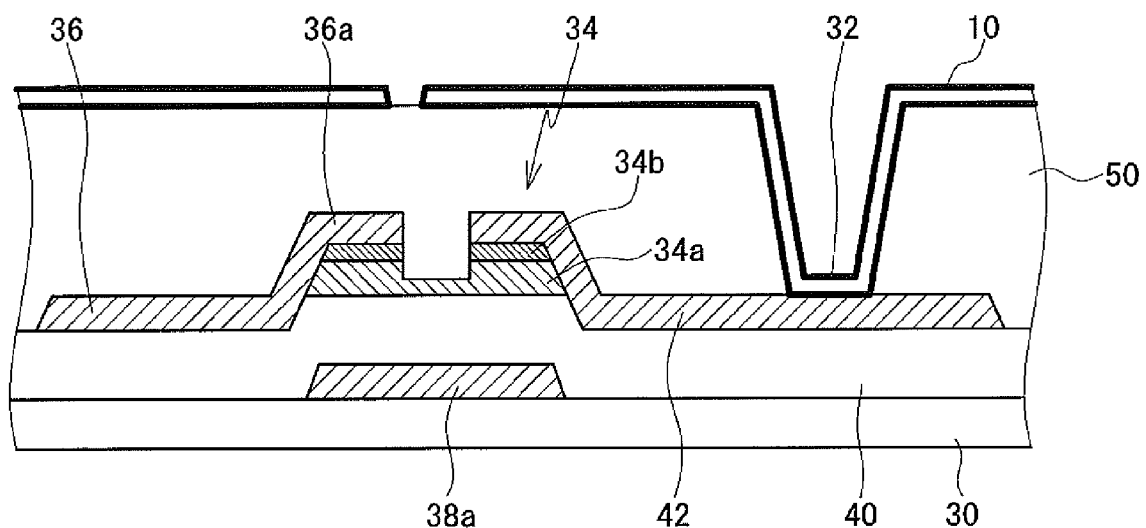
FIG. 2 is a cross-sectional view of a switching element and its surroundings in the AM substrate as viewed in the direction of the arrow A-A of FIG. 1.
Figure 3:
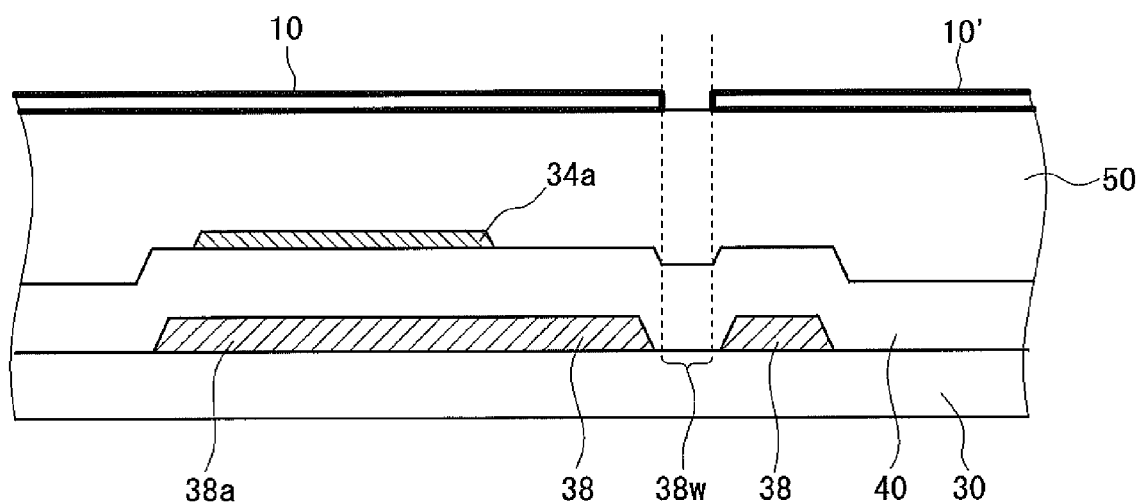
FIG. 3 is a cross-sectional view of the switching element and its surroundings in the AM substrate as viewed in the direction of the arrow B-B of FIG. 1.

FIG. 1 is a plan view of one of pixel electrodes arranged in a matrix in an active matrix substrate (AM substrate) 12 according to a first preferred embodiment of the present invention. FIG. 2 is a cross-sectional view of a switching element 34 and its surroundings in the AM substrate 12 as viewed in the direction of the arrow A-A of FIG. 1. FIG. 3 is a cross-sectional view of the switching element 34 and its surroundings in the AM substrate 12 as viewed in the direction of the arrow B-B of FIG. 1.

In the AM substrate 12, pixel electrodes 10 are arranged in a matrix on an AM-side transparent substrate 30, switching elements (for example, thin film transistors (TFT)) 34 are provided to the pixel electrodes 10 via contact portions (for example, contact holes) 32, and source lines 36 arranged to transmit display signals to the switching elements 34 and gate lines 38 arranged to transmit scanning signals to the switching elements 34 are provided so as to intersect with each other.

A brief description of the step of producing the AM substrate 12 will be provided referring to FIGS. 2 and 3. First, the gate lines 38 which also function as gate electrodes 38a of the switching elements 34 arranged in a matrix are provided on a surface of the transparent substrate 30 which is made from glass, plastic, or other material and has insulation properties. The gate lines 38 or the gate electrodes 38a are preferably prepared by forming a metal film of titanium, chromium, aluminum, molybdenum, tantalum, tungsten or copper, an alloy film of them, or a laminated film of them so as to have a thickness of 100 nm to 300 nm by sputtering method and subjecting the film to patterning by photo-etching so as to have a given pattern.

Next, a silicon nitride film defining a gate insulating film 40, a high-resistance semi-conductor layer 34a defining the switching elements 34 and made of amorphous silicon, polysilicon or other material, and a low-resistance semi-conductor layers 34b made of n+amorphous silicon or other material are preferably formed in order by plasma CVD (Chemical Vapor Deposition), and these films are subjected to patterning by photo-etching. The thickness of the silicon nitride film defining the gate insulating film 40 is about 300 nm to 500 nm, the thickness of the amorphous silicon film defining the high-resistance semi-conductor layer 34a is about 100 nm to 300 nm, and the thickness of the n+amorphous silicon film defining the low-resistance semi-conductor layer 34b is about 40 nm to 70 nm.

The TFT (switching element) 34 is prepared by subjecting the high-resistance semi-conductor layer 34a and the low-resistance semi-conductor layer 34b to channel etching by dry etching using a pattern of source electrodes 36a and drain lines 42 as a mask.

The source lines 36, the drain lines 42 and the source electrodes 36a are preferably prepared by forming a metal film of titanium, chromium, aluminum, molybdenum, tantalum, tungsten or copper, an alloy film of them, or a laminated film of them so as to have a thickness of 100 nm to 300 nm by sputtering method and subjecting the film to patterning by photo-etching so as to have a given pattern.

In addition, a resin film made of photosensitive acrylate resin or other material, an inorganic insulating film made of silicon nitride, oxide silicon or other material, or a laminated film of them are preferably provided as an interlayer insulating film 50 so as to cover the TFTs 34, the gate lines 38, the source lines 36 and the drain lines 42. Examples of the laminated film include a laminated film of a silicon nitride film which is formed by plasma CVD and has a thickness of about 200 nm to 500 nm, and a photosensitive acrylate resin film which is formed by spin coat method and has a thickness of about 2000 nm to 4000 nm. In this preferred embodiment of the present invention, the interlayer insulating film 50 is a photosensitive acrylate resin film.

The contact holes 32 that are the contact portions connecting the drain lines 42 and the pixel electrodes 10 are provided by patterning using photolithographic method (exposure and development) so as to perforate the interlayer insulating film 50.

The pixel electrodes 10 are provided as a layer over the interlayer insulating film 50. The pixel electrodes 10 are preferably provided by forming a conductive film with transparency made of ITO (indium-tin oxide), IZO (indium-zinc oxide), zinc oxide or tin oxide so as to have a thickness of about 100 nm to 200 nm by sputtering method, and subjecting the conductive film to patterning by photo-etching so as to have a given shape.

As shown in FIG. 1, in the AM substrate 12 produced as mentioned above, the pixel electrode 10 is divided into a plurality of minute regions 10b, and electrically connecting portions 10c connect the minute regions 10b integrally as one pixel electrode 10. In addition, the electrically connecting portions 10c are placed so as not to coincide with the lines such as the source line 36 and the gate line 38.

At least one of the minute regions 10b of the pixel electrode 10 is provided with the contact hole 32 that connects the pixel electrode 10 and the TFT 34. The TFT 34 performs on/off control of display signal voltages transmitted through the source line 36 based on scanning signal voltages transmitted through the gate line 38 and transmits the display signal voltages to the pixel electrode 10 via the drain line 42 and the contact hole 32.

As shown in FIG. 1, the gate line 38 has an opening portion 38w to coincide with a space between the minute region 10b having the contact hole 32 of the pixel electrode 10 and a minute region 10b' having a contact hole 32' of a pixel electrode 10' adjacent to the pixel electrode 10.

In the AM substrate 12, because the electrically connecting portions 10c that electrically connect the minute regions 10b of each of the pixel electrodes 10 arranged in a matrix on the AM-side transparent substrate 30 are placed so as not to coincide with light shields such as the lines which do not allow passage of light, even if a short between the adjacent pixel electrodes 10 and 10' occurs, correction can be performed without forming both pixels corresponding to the pixel electrodes 10 and 10' into black dots or bright dots.

Next, a brief description of an AM substrate inspecting step of detecting a defect of the AM substrate 12 produced as mentioned above will be provided. Here, two examples of inspection method will be described, i.e., an inspection utilizing an effect of electrical engineering, and an inspection utilizing pattern recognition.

The defect of the pixel electrode 10 in the AM substrate 12 is detected by an inspection device utilizing the effect of electrical engineering that when a crystal is placed in an electric field, light transmission of the crystal is varied according to the strength of the electric field.

A modulator of which transmittance is varied in accordance with electric field strength in a given voltage range is used, in which a transparent electrode is formed on one surface of the modulator, and a reflection plane arranged to reflect light is formed on the other surface of the modulator. The modulator is placed so that its reflection plane is opposed to the AM substrate 12. Light emitted from the electrode side of the modulator is transmitted through the modulator and reflected by the reflection plane. The reflection light is photo-received on a CCD (Charge Coupled Device) camera. Based on the strength of the reflection light, a defective pixel is specified.

In the pattern recognition, comparison is made to patterns of reflection light of adjacent pixels, and it is judged that a defect has occurred if there is a difference between the patterns. The defect of the pixel electrodes on the AM substrate 12 inspected as mentioned above is corrected by an AM substrate correcting step.

Figure 4:
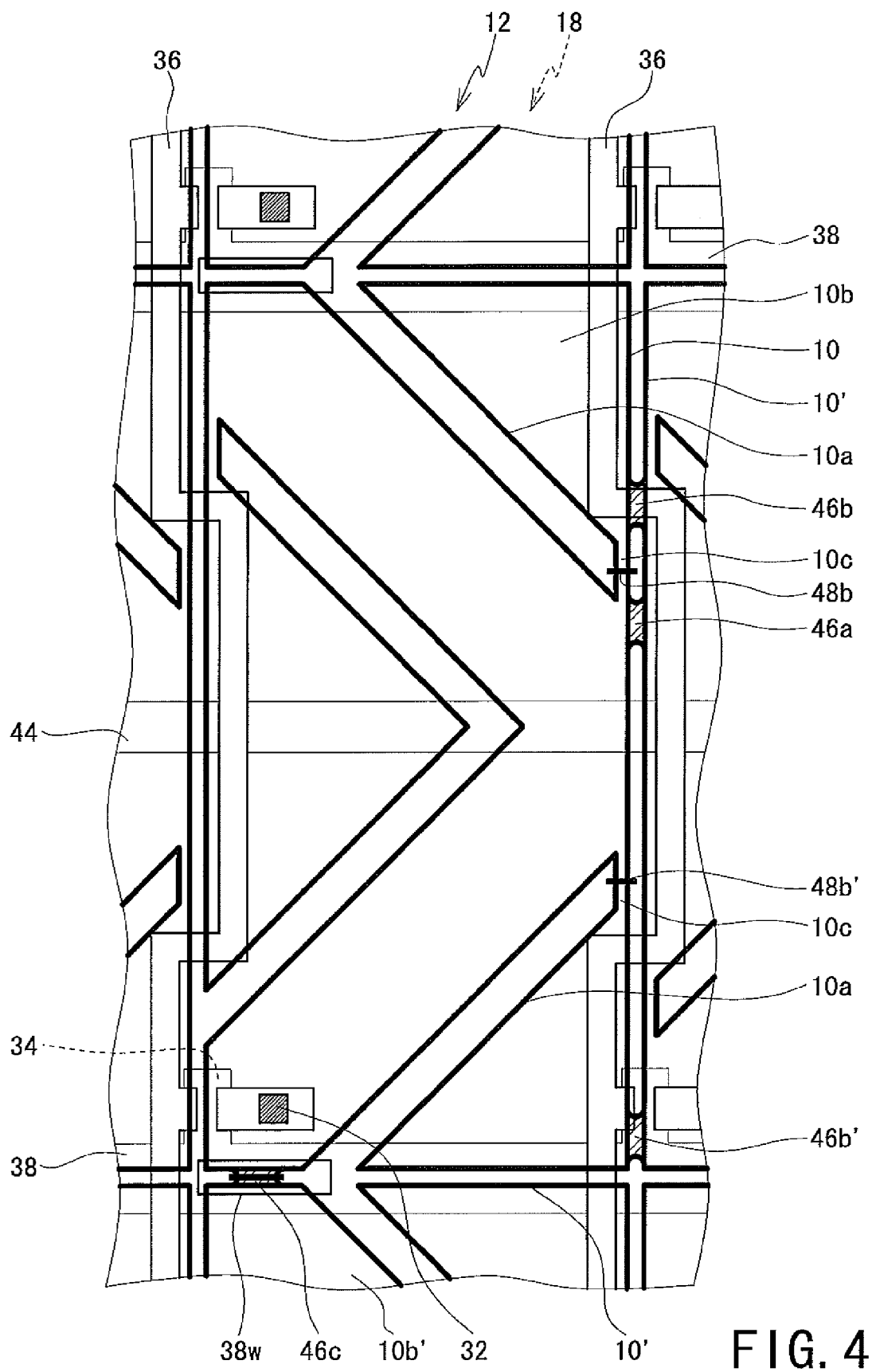
FIG. 4 is a view for schematically illustrating a method of correcting a defect in the AM substrate shown in FIG. 1.

A description of the AM substrate correcting step will be provided referring to FIG. 4. Specifically, a description of a method of correcting a liquid crystal panel for correcting a short between the adjacent pixel electrodes 10 and 10' on the AM substrate 12 will be provided.

The correction of a short 46a, 46b, 46b' or 46c between the adjacent pixel electrodes is performed by making laser irradiation to a given portion on the AM substrate 12 according to the location of the short between the adjacent pixel electrodes. In this correction method, a fundamental laser of an yttrium aluminum garnet (YAG) laser (1064 nm) which can be easily transmitted through glass to be used as a material for the AM-side transparent substrate 30 is suitably used.

FIG. 4 is a view for schematically illustrating the method of correcting the defect when the short between the adjacent pixel electrodes 10 and 10' occurs in the AM substrate 12. The short 46a is an example of a short which is not located over the lines such as the gate line 38 and the source line 36. In this case, making laser irradiation to the short 46a from a front side or a back side of the AM substrate 12 so as to make a disconnection at the short 46a is allowed, so that a display defect can be corrected.

The shorts 46b and 46b' are examples of shorts which are located over the lines such as the gate line 38 and the source line 36. In these cases, making laser irradiation to the shorts 46b and 46b' is not allowed. Thus, laser irradiation is made to the electrically connecting portion 10c of the pixel electrode 10 so as to make a disconnection at the electrically connecting portion 10c, so that defect correction can be performed.

For example, when the short 46b between the pixel electrodes 10 and 10' is to be corrected, laser irradiation is made to a disconnection position 48b of the electrically connecting portion 10c so as to make a disconnection at the electrically connecting portion 10c. By doing so, the minute region 10b having the short 46b is separated from the other minute regions 10b of the pixel electrode 10, and is connected to the adjacent pixel electrode 10' by the short 46b. In addition, when the short 46b' between the adjacent pixel electrodes 10 and 10' is to be corrected, laser irradiation is made to a disconnection position 48b' of the electrically connecting portion 10c so as to make a disconnection at the electrically connecting portion 10c, so that the minute region 10b in the lower right end of the pixel electrode 10 is separated from the pixel electrode 10 and connected to an adjacent pixel electrode 10' by the short 46b'.

It is more preferable if the electrically connection portions 10c that connect the minute regions 10b of the pixel electrode 10 are placed at peripheral portions of the pixel electrode 10 so as to coincide with a BM 26 of a CF filter 18. This is because if the disconnected electrically connecting portions 10c coincide with the BM 26, irregularity of display is not visually perceived even if the disconnected electrically connecting portions 10c become not smooth after the disconnection at the electrically connecting portion 10c by laser irradiation and slight irregularity occurs in alignment of liquid crystal molecules.

As mentioned above, if the short between the adjacent pixel electrodes 10 and 10' is located over the line such as the source line 36 and the gate line 38 or the electrode, the electrically connecting portion 10c that connects the minute region 10b having the short and the minute region 10b of the pixel electrode 10 is disconnected so as to separate the minute region 10b having the short from the pixel electrode 10 and connect the minute region 10b having the short to the adjacent pixel electrode 10'. Accordingly, the minute regions 10b other than the separated minute region 10b having the short can be normally operated in the pixel electrode 10, and the separated minute region 10b having the short is operated in synchronization with the adjacent pixel electrode 10'. In this way, the short between the adjacent pixel electrodes can be corrected so as not to be visually perceived without forming both pixels into black dots or bright dots.

The short 46c shown in FIG. 4 is an example of a short which is located over the space between the minute region 10b having the contact hole 32 that connects the switching element 34 and the pixel electrode 10 and the minute region 10b' having a contact hole of the adjacent pixel electrode 10'. In this case, the display defect cannot be corrected by separating the minute region 10b having the short from the other minute regions 10b in the same manner as the above-mentioned correction method. This is because the display signals cannot be supplied to the other minute regions 10b of the pixel electrode 10 if the minute region 10b having the contact hole 32 that connects the switching element 34 and the pixel electrode 10 is separated.

Therefore, the gate line 38 provided in the AM substrate 12 has the opening portion 38w to coincide with the space between the minute region 10b having the contact hole 32 of the pixel electrode 10 and the minute region 10b' having the contact hole of the adjacent pixel electrode 10'. Therefore, if the short 46c is located over the opening portion 38w, the display defect can be corrected by making laser irradiation to the short 46c so as to make a disconnection at the short 46c.

The BM 26 of the CF substrate 18 is more preferably provided so as to cover the opening portion 38w. By doing so, the disconnected portion coincides with the BM 26, and irregularity of display is not visually perceived even if slight irregularity occurs in alignment of liquid crystal molecules in a region where laser irradiation is made to the short 46c so as to make the disconnection at the short 46c.

As mentioned above, wherever the short between the adjacent pixel electrodes 10 and 10' is located, the display defect can be corrected by making the disconnection at the short by laser irradiation or by separating the minute region of the pixel electrode having the short from the other minute regions by laser irradiation.

Figure 5:
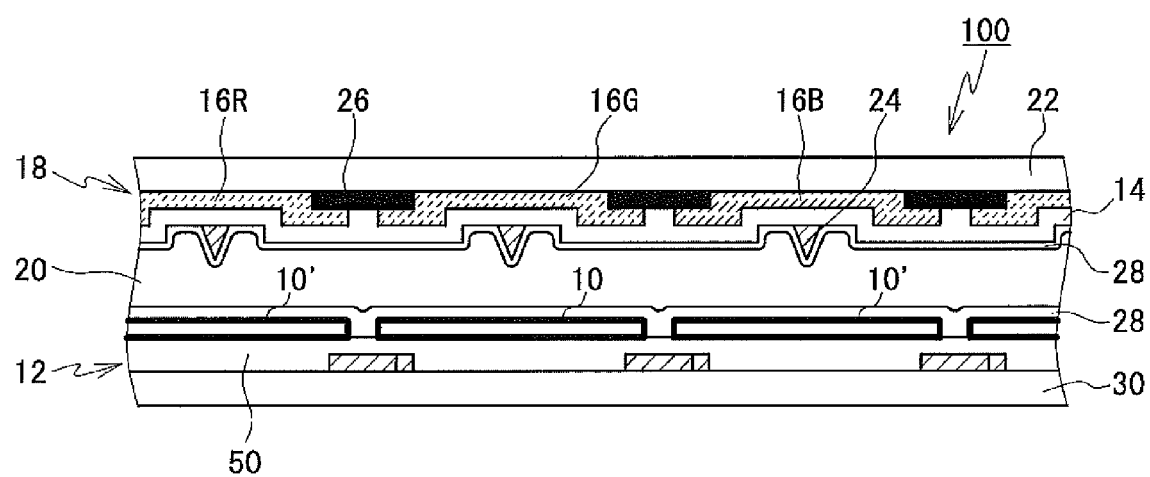
FIG. 5 is a schematic cross-sectional view of a liquid crystal panel having the AM substrate shown in FIG. 1.
Figure 6:
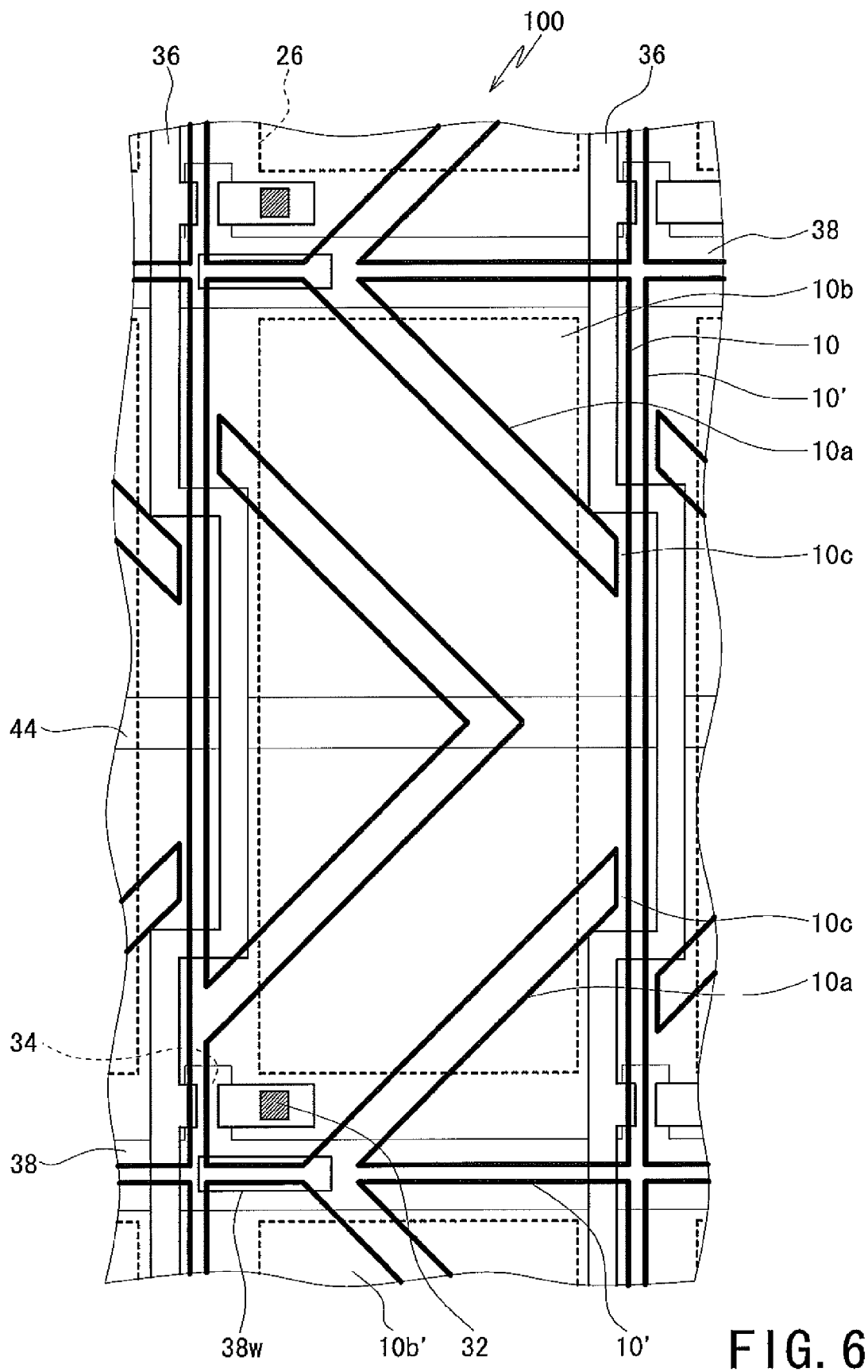
FIG. 6 is a magnified plan view of one pixel of the liquid crystal panel shown in FIG. 5.

A liquid crystal panel 100 is produced by opposing and putting together the AM substrate 12 thus produced and corrected and the CF substrate 18 leaving a given space, and sealing in a liquid crystal between the substrates. A liquid crystal panel producing step will be described referring to FIGS. 5 and 6. FIG. 5 is a schematic cross-sectional view of the liquid crystal panel 100. FIG. 6 is a plan view of one of pixels arranged in a matrix which are shown in FIG. 5.

First, the CF substrate 18 is produced by the following procedures. A negative acrylic photopolymer liquid in which carbon particles are dispersed is coated on a CF-side transparent substrate 22 by spin coat method, and then dried so as to form a black photopolymer layer. Subsequently, the black photopolymer layer is exposed to light via a photomask so as to make development. Thus, the BM 26 defining a light shielding region of a grid pattern arranged to cover and light shield a region corresponding to peripheral portions of the pixel electrodes 10 in the AM substrate 12 opposed to the CF substrate 18 is formed. At the time of forming the BM 26, opening portions 26a for first, second and third coloring layers are formed in regions where a first coloring layer (e.g., red color filter) 16R, a second coloring layer (e.g., green color filter) 16G, and a third coloring layer (e.g., blue color filter) 16B corresponding to the pixel electrodes 10 are to be formed.

Next, the first coloring layer 16R is formed in such a manner that a negative acrylic photopolymer liquid in which pigments are dispersed is coated on the opening portion 26a for the first coloring layer 16R by spin coat method, and then subjected to drying, light exposure by using a photomask and development. The second coloring layer 16G and the third coloring layer 16B are formed in the same manner as the first coloring layer 16R. Thus, a color filter layer is obtained.

In addition, transparent electrodes (common electrodes) 14 made of ITO or other material are formed by sputtering. Then, vertical alignment control protrusions 24 are formed in such a manner that positive novolac-type phenolic resin liquid is coated on the transparent electrodes 14 by spin coat method, and then subjected to drying, light exposure by using a photo mask and development. Thus, the CF substrate 18 is obtained.

Oriented films 28 are coated on the AM substrate 12 and the CF substrate 18. Before coating the AM substrate 12 and the CF substrate 18 with the oriented films 28, the AM substrate 12 and the CF substrate 18 are subjected to sintering for degassing, and then washed. After coating the AM substrate 12 and the CF substrate 18 with the oriented films 28, the AM substrate 12 and the CF substrate 18 are washed, and then subjected again to sintering for degassing. The oriented films 28 regulate alignment directions of liquid crystal molecules.

A liquid crystal 20 is sealed in between the AM substrate 12 and the CF substrate 18. Here, a brief description of a method of drop filling the liquid crystal 20 and bonding the AM substrate 12 and the CF substrate 18 will be provided as an example. A UV hardening seal resin is coated on a peripheral portion of the AM substrate 12, and the liquid crystal 20 is drop filled in the CF substrate 18 by the drop filling method. By the drop filling method, a proper amount of liquid crystal is dropped in order that a cell gap (a space between the AM substrate 12 and the CF substrate 18) may become proper in accordance with the type of liquid crystal. For example, in an 20-model VGA (Video Graphics Array), when the cell gap is to be 3.7 μm, drop filling is regularly made to the inside of the sealed portion under the conditions that the amount of one drop is 1.3 mg, the total number of drops is 300, and the total amount of drops is 395 mg.

In order to bond the CF substrate 18 and the AM substrate 12 subjected to seal drawing and drop filling of the liquid crystal, an atmosphere inside a bonding device is reduced to 1 Pa, the substrates are bonded under the reduced pressure, and the atmosphere is made to standard pressure, so that the sealed portion is flatten out and the desired cell gap of the sealed portion is obtained. Next, the structure with the desired cell gap in the sealed portion is subjected to UV irradiation by a UV hardening device so as to temporarily harden the seal resin, and is then subjected to baking so as to make final hardening. At this point, the liquid crystal 20 is filled throughout the inside portion of the sealed resin, so that it is sealed in between the AM substrate 12 and the CF substrate 18. After the completion of the baking, the structure is segmentalized into liquid crystal panels. Thus, the liquid crystal panel 100 is obtained.

It is also preferable that the liquid crystal 20 is infused by vacuum infusion. In the vacuum infusion, a thermal hardening resin is coated on peripheral portions of the AM substrate 12 and the CF substrate 18 while providing an infusion hole for liquid crystal infusion, the infusion hole is immersed in the liquid crystal in a vacuum and is released to atmospheric pressure so that the liquid crystal is infused into the infusion hole, and thereafter, the infusion hole is closed by a UV hardening resin or other material.

The liquid crystal panel 100 produced as mentioned above makes color display in such a manner that liquid crystal molecules of the liquid crystal 20 are aligned by an electric field between the pixel electrodes 10 on the AM substrate 12 and the common electrodes 14 on the CF substrate 18 so as to control transmission of light for each of the pixels, and the light is transmitted through the first, second and third coloring layers 16R, 16G and 16B.

The light-shielding BM 26 is provided on the peripheral portions of the first, second and third coloring layers 16R, 16G and 16B in order to prevent a light leak between the coloring layers of different colors and other problems. It is preferable that the opening portion 38w provided to the gate line 38 of the AM substrate 12 is placed so as to coincide with the BM 26 as shown in FIG. 6, and the electrically connecting portions 10c are placed at the peripheral portions of the pixel electrode 10 so as to coincide with the BM 26 of the CF substrate 18.

By placing the electrically connecting portions 10c that connect the minute regions 10b of each of the pixel electrodes 10 at the peripheral portions of the pixel electrode 10 as mentioned above, the electrically connecting portions 10c coincide with the BM 26 of the CF substrate 18. If the disconnected electrically connecting portions 10c coincide with the BM 26, irregularity of display is less visually perceived even if the electrically connecting portions 10c become not smooth after the disconnection at the electrically connecting portion 10c by laser irradiation which is made in order to correct the short between the adjacent pixel electrodes and slight irregularity occurs in alignment of liquid crystal molecules.

In addition, in the liquid crystal panel 100, slits 10a arranged to divide the pixel electrode 10 into the minute regions are provided so as to be inclined in different directions in one pixel electrode 10. Therefore, liquid crystal molecules provided between the slits 10a and the alignment control protrusions 24 are made to have different alignment directions, so that display in the MVA mode with a favorable wide viewing angle is achieved.

By dividing each of the pixel electrodes 10 into the minute regions 10b by the slits 10a and inclining the slits 10a with respect to the edges of the pixel electrode 10 in the different directions with each other, it becomes possible to make display in the MVA mode in which different alignment directions of liquid crystal molecules are included in each of the pixels, so that viewing angle characteristics of the liquid crystal panel 100 can be improved.

Figure 7:
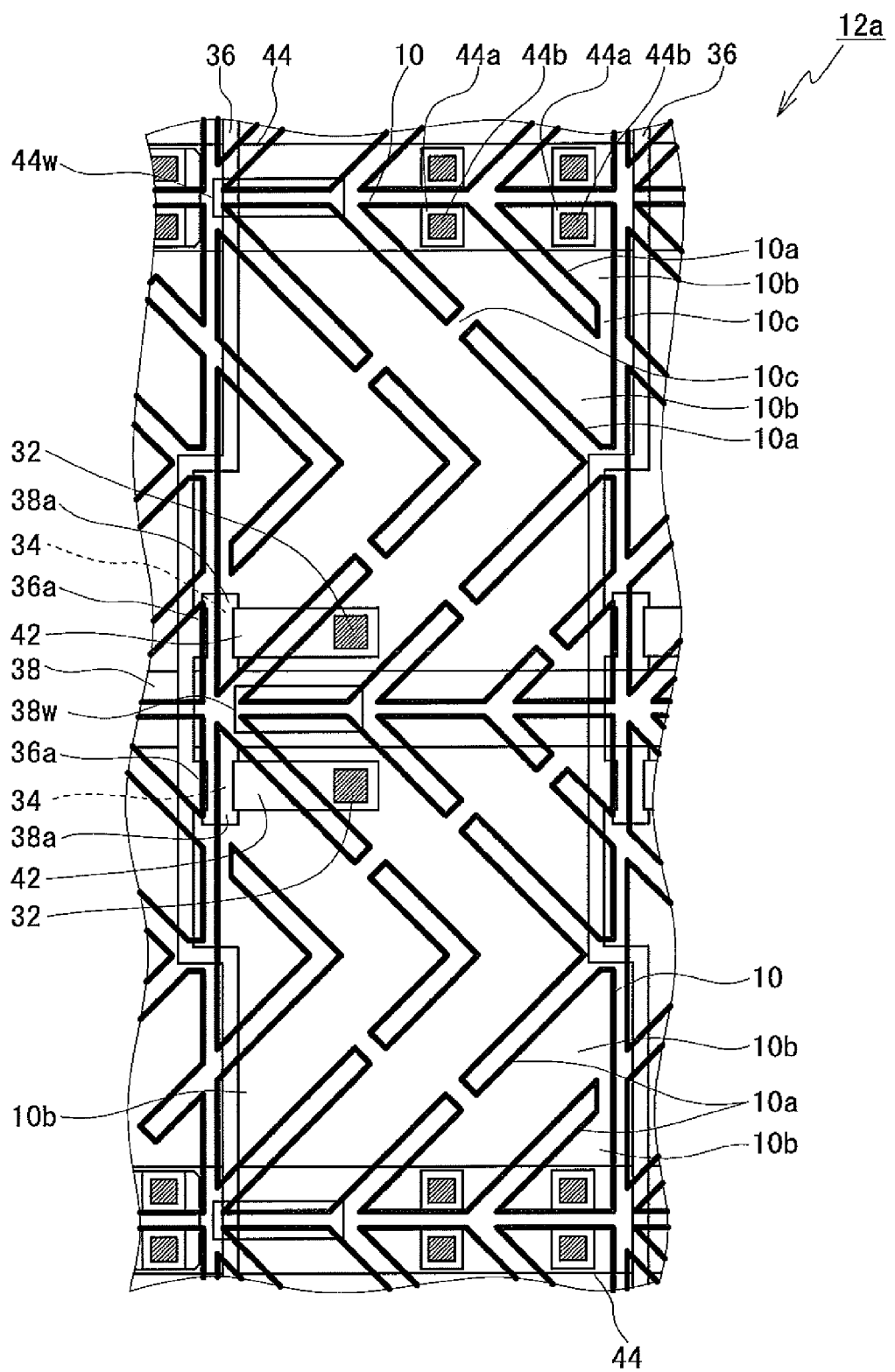
FIG. 7 is a magnified plan view of two of pixel electrodes in an AM substrate 12a of a liquid crystal panel according to a second preferred embodiment of the present invention.

A description of a second preferred embodiment of the present invention will be provided referring to FIG. 7. FIG. 7 is a magnified plan view of two of pixel electrodes in an AM substrate 12a provided to a liquid crystal panel according to the second preferred embodiment of the present invention.

This liquid crystal panel is similar to a liquid crystal panel in which a plurality of pixels are assumed to form one pixel group, and the pixels in the pixel group have different gradations, so that display of predetermined gradations is achieved by the pixel group (see Japanese Patent Application Unexamined Publications Nos. 2004-258139 and 2004-62146).

As shown in FIG. 7, in the AM substrate 12a, pixel electrodes 10 are arranged in a matrix on an AM-side transparent substrate, to which switching elements (e.g., TFT) 34 are provided which perform on/off control of display signal voltages transmitted through source lines 36 based on scanning signal voltages transmitted through gate lines 38 and transmit the display signal voltages to the pixel electrodes 10.

On a surface of the AM-side transparent substrate, a plurality of gate lines 38 and auxiliary capacitance lines 44 are alternately provided so as to be parallel to each other. In a layer over them via the gate insulating film 40, source lines 36 are provided so as to intersect at a right angle with the gate lines 38 and the auxiliary capacitance lines 44.

In the vicinity of the intersection of the source line 36 and the gate line 38, two source electrodes 36a are provided so as to extend from the source line 36, and two gate electrodes 38a are provided so as extend from the gate line 38. Each pair of the source electrode 36a and the gate electrode 38a is connected to one switching element 34. The pixel electrodes 10 are connected to the switching elements 34 via contact holes 32 and drain lines 42.

The pixel electrode 10 has slits 10a arranged to be inclined in different directions and divide the pixel electrode 10 into a plurality of minute regions 10b, and electrically connecting portions 10c which are provided to the slits 10a so as to connect the minute regions 10 integrally as one pixel electrode 10.

In addition, the electrically connecting portions 10c are placed so as not to coincide with the source line 36, the gate line 38, and the auxiliary capacitance line 44.

In addition, the gate line 38 has an opening portion 38w, and the auxiliary capacitance line 44 has an opening portion 44w. Therefore, a space between the minute regions 10b having the contact holes 32 of the adjacent pixel electrodes 10 is placed so as not to coincide with the lines or the electrodes.

By bonding the AM substrate 12a and the color filter substrate 18 so that the pixel electrodes 10 and the common electrodes 14 are opposed to each other and sealing in the liquid crystal 20 between the substrates, the liquid crystal panel according to the second preferred embodiment of the present invention is obtained.

Liquid crystal capacitances are provided between the pixel electrodes 10 and the opposed common electrodes 14 interposing the liquid crystal layer 20 therebetween. Auxiliary capacitance electrodes 44a are connected to the pixel electrode 10 via contact holes 44b, and auxiliary capacitances are provided between the auxiliary capacitance electrodes 44a and the auxiliary capacitance line 44 provided opposed to the auxiliary capacitance electrodes 44a via the gate insulating film 40.

Owing to this configuration, the source line 36 and the gate line 38 can be shared by the two adjacent pixel electrodes as shown in FIG. 7, and display signal voltages with the same amplitude can be supplied with the same timing. In addition, by supplying auxiliary capacitance voltages different to each other to the auxiliary capacitance line 44, different voltages are applied to the pixel electrodes 10 in one pixel group consisting of two vertically adjacent pixels, so that the pixels in one pixel group have different gradations (luminance). Accordingly, display with a favorable wide viewing angle can be achieved.

The pixel electrodes in the liquid crystal panel thus produced are inspected for a defect between the adjacent pixel electrodes by a liquid crystal panel inspecting step. A light source is placed behind the liquid crystal panel, and the light source is lit. Electric signals are supplied to the liquid crystal panel, and transmittance of light projected from the light source is adjusted so as to display a given image on the liquid crystal panel. The image is inspected preferably visually so as to inspect the liquid crystal panel for a defect such as a short between the adjacent pixel electrodes based on display irregularity.

Figure 8:
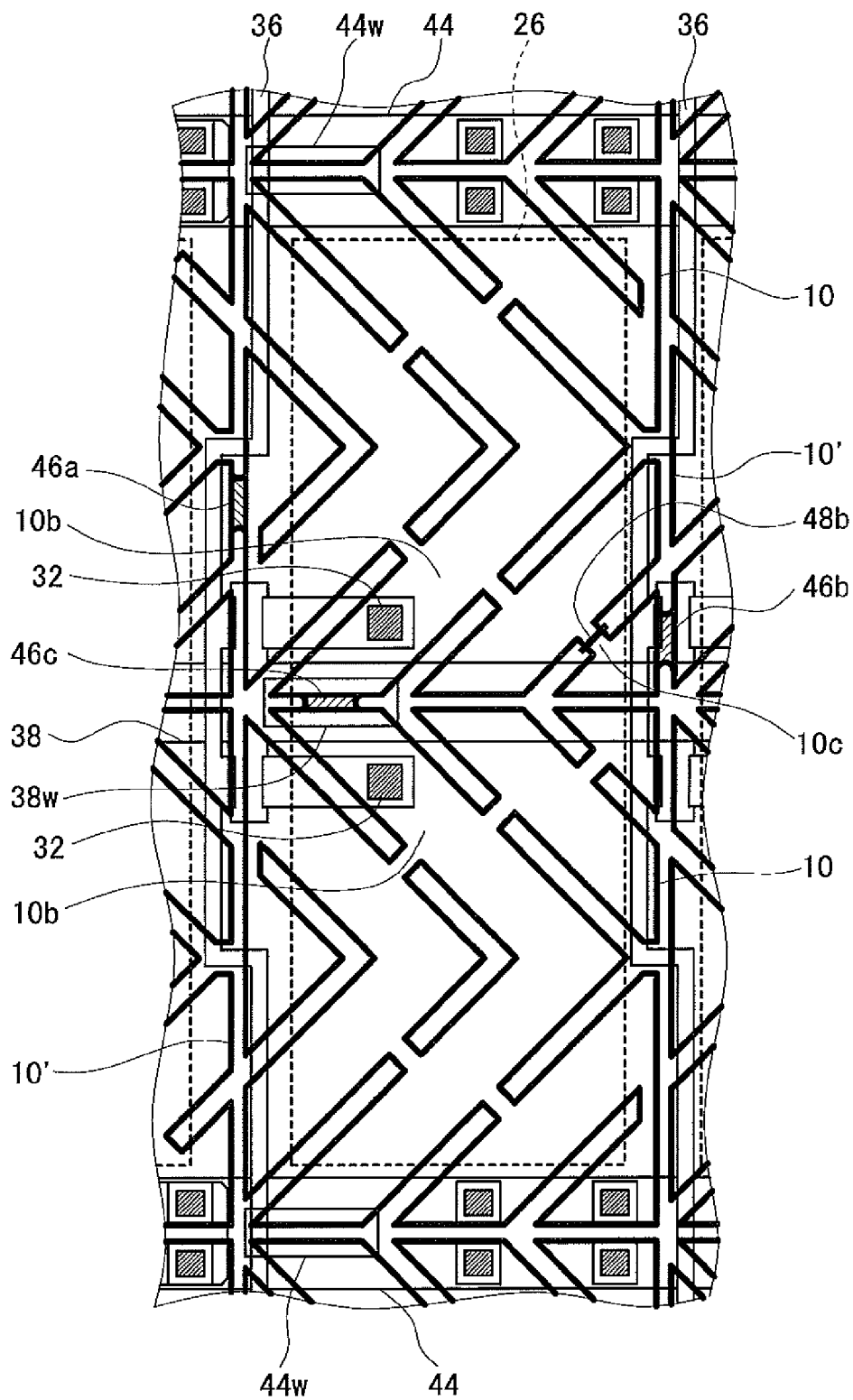
FIG. 8 is a view for schematically illustrating a method of correcting a defect of the liquid crystal panel according to a third preferred embodiment of the present invention.

The detected defect of the liquid crystal panel is corrected in a liquid crystal panel correcting step. FIG. 8 is a view schematically illustrating a method of correcting the defect of the liquid crystal panel according to a third preferred embodiment of the present invention in a case where the defect occurs between the adjacent pixel electrodes 10 and 10' of the liquid crystal panel according to the second preferred embodiment of the present invention.

A short 46a shown in FIG. 8 is an example of a short which is not located over the lines such as the gate line 38 and the source line 36. In this case, making laser irradiation to the short so as to make a disconnection at the short is allowed, so that a display defect can be corrected.

A short 46b is an example of a short which is located over the lines such as the gate line 38 and the source line 36. In this case, making laser irradiation to the short is not allowed. Thus, laser irradiation is made to an electrically connecting portion 10c of the pixel electrode 10 so as to make a disconnection at the electrically connecting portion 10c, so that defect correction can be performed.

For example, when the short 46b between the pixel electrodes 10 and 10' is to be corrected, laser irradiation is made to a disconnection position 48b of the electrically connecting portion 10c so as to make a disconnection at the electrically connecting portion 10c. By doing so, the minute region 10b having the short 46b is separated from the pixel electrode 10 and connected to the adjacent pixel electrode 10' by the short 46b.

By separating the minute region 10b having the short from the other minute regions 10b as mentioned above, the minute regions 10b other than the separated minute region 10b having the short can be normally operated in the pixel electrode 10, and the separated minute region 10b having the short is operated in synchronization with the adjacent pixel electrode 10'. In this way, the short between the adjacent pixel electrodes 10 and 10' can be corrected so as to be less visually perceived.

The electrically connecting portions 10c that connect the minute regions 10b in the pixel electrode 10 are more prefer-ably placed at the peripheral portions of the pixel electrode 10 so as to coincide with the BM 26 of the CF substrate 18.

A short 46c is an example of a short which is located over the space between the minute regions 10b having the contact holes 32 of the adjacent pixel electrodes 10 in one pixel group. In this case, the display defect cannot be corrected by separating the minute region 10b having the short 46c from the other minute region 10b. This is because separating the minute region 10b having the contact hole 32 that connects the switching element 34 and the pixel electrode 10 prevents display signals from being supplied to the other minute regions 10b within the same pixel electrode 10.

Therefore, the gate line 38 of the liquid crystal panel according to the second preferred embodiment of the present invention has the opening portion 38w to coincide with the space between the minute regions 10b having the contact holes 32 that connect the switching elements 34 and the pixel electrodes 10. Therefore, if the short 46c is located over the opening portion 38w, laser irradiation is made to the short 46c from the back side of the AM substrate 12 so as to make a disconnection at the short 46c, so that the display defect can be corrected.

As mentioned above, in the liquid crystal panel according to the second preferred embodiment of the present invention, wherever the short between the adjacent pixel electrodes 10 and 10' is located, the display defect can be corrected by making the disconnection at the short by making laser irradiation to the short from the back side of the AM substrate 12 or by separating the minute region of the pixel electrode having the short from the other minute regions by making laser irradiation to the short from the back side of the AM substrate 12. Accordingly, it is not necessary to form both pixels corresponding to the pixel electrodes 10 and 10' into black dots (or bright dots) in order to perform defect correction.

In the liquid crystal panel according to the second preferred embodiment of the present invention, display with a favorable wide viewing angle is achieved by assuming that the plurality of pixels form one pixel group, and making the pixels in the pixel group have different gradations so that predetermined gradations are displayed by the pixel group. Therefore, by correcting the short between the adjacent pixel electrodes using the correction method according to the third preferred embodiment of the present invention, a region in which different gradations are displayed is maintained even partially in the pixel group. Therefore, the advantage of display with different gradations is not impaired.

It is sufficient if either one of the AM substrate inspecting and correcting steps and the liquid crystal panel inspecting and correcting steps is performed when the liquid crystal panel is produced. However, both of them may be performed. If both of the AM substrate inspecting and correcting steps and the liquid crystal panel inspecting and correcting steps are performed, the defect correction can be performed with higher accuracy. Accordingly, it becomes possible to prevent products with defects from being put on the market with high probability.

Figure 9:
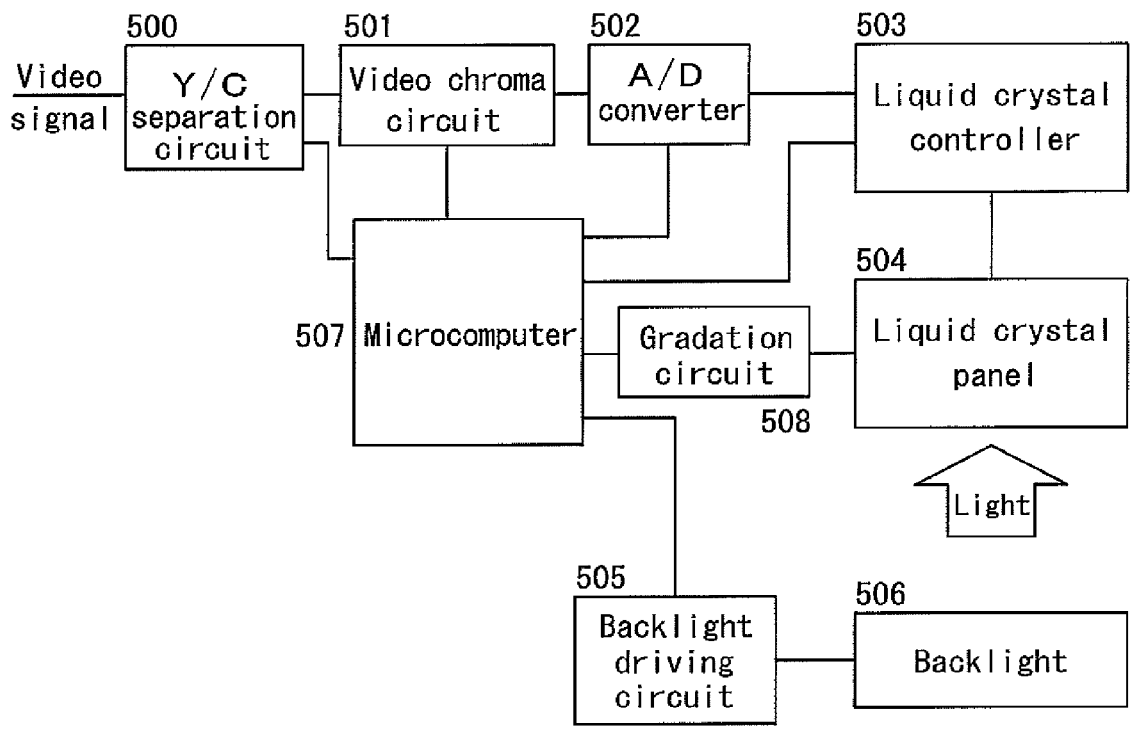
FIG. 9 is a block diagram of a system of a liquid crystal display device according to a fourth preferred embodiment of the present invention.

FIG. 9 is a block diagram of a system of a liquid crystal display device according to a fourth preferred embodiment of the present invention. The liquid crystal display device has a Y/C separation circuit 500, a video chroma circuit 501, an A/D converter 502, a liquid crystal controller 503, a liquid crystal panel 504, a backlight driving circuit 505, a backlight 506, a microcomputer 507, and a gradation circuit 508. For the liquid crystal panel 504, the liquid crystal panel according to the second or third preferred embodiment of the present invention is used.

Television signals as video signals are inputted to the Y/C separation circuit 500 so as to be separated into gradation signals and color signals. The gradation signals and the color signals are converted into light's three primary colors of red (R), green (G), and blue (B) by the video chroma circuit 501, and analog RGB signals thereof are converted into digital RGB signals by the A/D converter 502 and are inputted to the liquid crystal controller 503.

To the liquid crystal panel 504, the RGB signals from the liquid crystal controller 503 are inputted with given timing, and gradation voltages for RGB are supplied from the gradation circuit 508, so that an image is displayed. The control of the whole system including these processes is performed by the microcomputer 507.

Owing to the above-mentioned liquid crystal display device, display can be made based on various video signals such as video signals of television broadcasting, video signals of a camera, and video signals supplied by the Internet.

Figure 10:
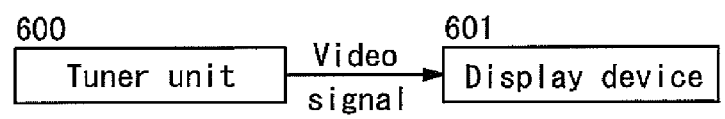
FIG. 10 is a block diagram of a system of a television receiver according to a fifth preferred embodiment of the present invention.

By including a tuner unit as a receiving mechanism arranged to receive airwaves in the liquid crystal display device, a television receiver according to a fifth preferred embodiment of the present invention is obtained. A tuner unit 600 shown in FIG. 10 receives television broadcasting and outputs video signals, and a liquid crystal display device 601 makes image (video) display based on the video signals outputted from the tuner unit 600. For the display device 601, the liquid crystal display device according to the fourth preferred embodiment of the present invention shown in FIG. 9 can be used.

In the preferred embodiments of the present invention, inversely staggered TFTs are used in the active matrix substrate, which, however, is not limited in particular, and staggered TFTs may be used. In addition, in the preferred embodiments of the present invention, an amorphous silicon thin film transistor is used for the switching element (TFT). However, a micro crystal silicon thin film transistor, a polysilicon thin film transistor, a CG silicon (continuous grain boundary crystal silicon) thin film transistor, and an MIM (Metal Insulator Metal) may be preferably used for the switching element.

In addition, while the preferred embodiments of the present invention show an example that the source line of the AM substrate has a rectangularly zigzag pattern such that portions of the source line coincide with the adjacent pixel electrode, and is placed at the peripheral portion of the pixel electrode, a source line having a center source structure in which a linear source line is provided at the center of the pixel electrode, and a source line having a structure in which a plurality of source lines are placed in parallel and all of the lines are connected by a plurality of portions thereof may be used.

In addition, the preferred embodiments of the present invention show the MVA type liquid crystal display device, which, however, is not specifically limited, and a liquid crystal display device other than the MVA type liquid crystal display device may be used. In addition, the preferred embodiments of the present invention are not limited to the liquid crystal display device. For example, another configuration may be used in which the active matrix substrate according to the preferred embodiments of the present invention is placed so as to be opposed to a color filter substrate, an organic EL layer is interposed between the substrates so as to provide an organic EL panel, and drivers are connected to output extraction terminals of the panel so that an organic EL display device is provided. In addition, the preferred embodiments of the present invention can be used for other display devices than the liquid crystal display device and the organic EL display device if the active matrix substrate is included in the display device.

INDUSTRIAL APPLICABILITY

Because the liquid crystal panel and the defect correction method of the liquid crystal panel according to the preferred embodiments of the present invention are such that the display defect in the liquid crystal panel resulting from the short between the pixel electrodes can be effectively corrected, they are suitable for a display device of which display performance with high quality is required.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An active matrix substrate comprising:
a transparent substrate;
a plurality of pixel electrodes, each of which includes a plurality of divided minute regions that are integrally connected with one another by electrically connecting portions; and
a plurality of lines arranged to transmit signals to the pixel electrodes, the pixel electrodes and the lines being arranged in layers, wherein
at least one of the minute regions of each of the pixel electrodes comprises a contact portion arranged to transmit the signals to each of the pixel electrodes, and
the lines comprise an opening portion that is placed so as to coincide with a space between the minute regions comprising the contact portions of adjacent pixel electrodes.

2. A liquid crystal panel comprising:
first and second transparent substrates interposing a liquid crystal therebetween, wherein the first transparent substrate is an active matrix substrate that comprises, on a surface facing the second transparent substrate, a plurality of pixel electrodes each of which includes a plurality of divided minute regions that are integrally connected with one another by electrically connecting portions,
a plurality of lines arranged to transmit signals to the pixel electrodes, the pixel electrodes and the lines being arranged in layers,
the second transparent substrate comprising, on a surface facing the first transparent substrate, common electrodes opposed to the pixel electrodes, at least one of the minute regions of each of the pixel electrodes comprises a contact portion arranged to transmit the signals to each of the pixel electrodes, and
the lines comprise an opening portion that is placed so as to coincide with a space between the minute regions comprising the contact portions of adjacent pixel electrodes.

3. The liquid crystal panel according to claim 2, wherein
the second transparent substrate further comprises a light shielding region so as to cover peripheral portions of the pixel electrodes provided to the first transparent substrate, and
the opening portion provided to the lines of the first transparent substrate is placed so as to coincide with the light shielding region of the second transparent substrate.

4. The liquid crystal panel according to claim 2, wherein
liquid crystal capacitances are provided between the pixel electrodes and the common electrodes opposed to the pixel electrodes interposing the liquid crystal,
auxiliary capacitances are provided to the liquid crystal capacitances, and
a plurality of adjacent pixels are assumed to form one pixel group, wherein signals of the same amplitude are supplied through shared lines to the liquid crystal capacitances of each of the pixel groups and different auxiliary capacitance voltages are supplied to the auxiliary capacitances of each of the pixel groups in order to have different effective values of voltages in the liquid crystal capacitances of each of the pixel groups.

5. The liquid crystal panel according to claim 2, wherein each of the pixel electrodes comprises a plurality of slits arranged to divide the minute regions which are integrally connected by the electrically connecting portions and be inclined in different directions with respect to the edges of each of the pixel electrodes so as to make liquid crystal molecules to be aligned between the pixel electrodes and the common electrodes have different alignment directions according to the inclination directions of the slits.

6. A display device comprising the active matrix substrate according to claim 1.

7. A liquid crystal display device comprising the liquid crystal panel according to claim 2 as a display mechanism.

8. A television receiver comprising:
a receiving mechanism arranged to receive airwaves; and
a display mechanism arranged to display contents of the airwaves received by the receiving mechanism, wherein the liquid crystal panel according to claim 2 is used as the display mechanism.

9. An active matrix substrate correction method for correcting a defect resulting from a short between adjacent pixel electrodes of the active matrix substrate according to claim 1, wherein
when a short between the pixel electrodes is at the opening portion of the lines, laser irradiation is made to the short in the opening portion so as to disconnect the short.

10. A liquid crystal panel correction method for correcting a defect resulting from a short between adjacent pixel electrodes of the liquid crystal panel according to claim 2 wherein
when a short between the pixel electrodes is at the opening portion of the lines, laser irradiation is made to the short in the opening portion so as to disconnect the short.

* * * * *